United States Patent
Franklin

(10) Patent No.: US 10,467,733 B2
(45) Date of Patent: Nov. 5, 2019

(54) MULTIPLEXED HIGH DYNAMIC RANGE IMAGES

(71) Applicant: Raytheon Company, Waltham, MA (US)

(72) Inventor: Craig R. Franklin, McKinney, TX (US)

(73) Assignee: Raytheon Company, Waltham, MA (US)

( * ) Notice: Subject to any disclaimer, the term of this patent is extended or adjusted under 35 U.S.C. 154(b) by 270 days.

(21) Appl. No.: 15/662,055

(22) Filed: Jul. 27, 2017

(65) Prior Publication Data

US 2019/0035064 A1   Jan. 31, 2019

(51) Int. Cl.

| G06K 9/00 | (2006.01) |
|---|---|
| G06T 5/00 | (2006.01) |
| G06T 5/50 | (2006.01) |
| G06T 7/40 | (2017.01) |
| G06T 7/246 | (2017.01) |
| G06T 1/60 | (2006.01) |
| G06T 7/13 | (2017.01) |

(Continued)

(52) U.S. Cl.
CPC .............. *G06T 5/008* (2013.01); *G06T 1/60* (2013.01); *G06T 5/007* (2013.01); *G06T 5/40* (2013.01); *G06T 5/50* (2013.01); *G06T 7/13* (2017.01); *G06T 7/248* (2017.01); *G06T 7/40* (2013.01); *H04N 5/2355* (2013.01); *H04N 5/23254* (2013.01); *H04N 5/35581* (2013.01); *G06T 2207/10016* (2013.01); *G06T 2207/10024* (2013.01); *G06T 2207/10144* (2013.01); *G06T 2207/20208* (2013.01); *G06T 2207/20216* (2013.01); *G06T 2207/20221* (2013.01)

(58) Field of Classification Search
CPC .. G06T 5/008; G06T 5/50; G06T 7/40; G06T 2207/20216; G06T 7/248; G06T 1/60; G06T 7/13
See application file for complete search history.

(56) References Cited

U.S. PATENT DOCUMENTS

| 7,239,757 B2 | 7/2007 | Kang et al. |
| 7,382,931 B2 | 6/2008 | Kang et al. |

(Continued)

FOREIGN PATENT DOCUMENTS

| EP | 3076364 A1 | 10/2016 |
| EP | 3128740 A1 | 2/2017 |

(Continued)

OTHER PUBLICATIONS

International Search Report for International Application No. PCT/US2018/032745 dated Aug. 13, 2018, 17 pages.

*Primary Examiner* — Amir Alavi

(57) ABSTRACT

Technology is described for creating time multiplexed, high dynamic range images. The method can include the operation of obtaining a first image having a base exposure level captured from an image sensor. The first image can be stored in an accumulation memory. Another operation is obtaining a second image having a modified exposure level as compared to the base exposure level. A determination can be made as to whether incoming pixels in the second image exceed a saturation threshold. The pixels of the second image can be combined with the pixels of the first image to form a high dynamic range image in the accumulation memory.

20 Claims, 7 Drawing Sheets

(51) Int. Cl.
   *G06T 5/40* (2006.01)
   *H04N 5/232* (2006.01)
   *H04N 5/235* (2006.01)
   *H04N 5/355* (2011.01)

(56) References Cited

U.S. PATENT DOCUMENTS

| | | | | |
|---|---|---|---|---|
| 8,406,569 | B2 * | 3/2013 | Segall | G06T 5/50 |
| | | | | 382/254 |
| 8,774,559 | B2 * | 7/2014 | Segall | G06T 5/50 |
| | | | | 382/294 |
| 8,786,732 | B2 * | 7/2014 | Puetter | H04N 5/35563 |
| | | | | 257/291 |
| 8,860,856 | B2 * | 10/2014 | Wetzstein | G06T 5/50 |
| | | | | 348/222.1 |
| 8,988,539 | B1 * | 3/2015 | Pascoguin | H04N 5/2355 |
| | | | | 348/218.1 |
| 9,055,178 | B2 * | 6/2015 | Hirakawa | H04N 9/04 |
| 9,100,581 | B2 * | 8/2015 | Wilburn | H04N 5/2354 |
| 10,122,943 | B1 * | 11/2018 | Chen | H04N 5/2258 |
| 2005/0024317 | A1 | 2/2005 | Sano | |
| 2010/0003024 | A1 * | 1/2010 | Agrawal | H04N 5/2254 |
| | | | | 396/340 |
| 2011/0188744 | A1 | 8/2011 | Sun | |
| 2012/0038797 | A1 | 2/2012 | Jang et al. | |
| 2014/0240547 | A1 | 8/2014 | McKay | |
| 2017/0339327 | A1 * | 11/2017 | Koshkin | H04N 5/2355 |
| 2019/0035064 | A1 * | 1/2019 | Franklin | G06T 5/008 |

FOREIGN PATENT DOCUMENTS

| | | |
|---|---|---|
| KR | 20160030352 A | 3/2016 |
| TW | 2016-11613 A | 3/2016 |
| TW | 2016-36821 A | 10/2016 |

* cited by examiner

MULTIPLEXED HIGH DYNAMIC RANGE IMAGES

BACKGROUND

High dynamic range imaging is used in optical imaging and photography to reproduce a greater range of luminosity than is possible with imaging techniques using smaller luminance ranges for each image exposure. HDR (high dynamic range) can present a range of luminance in an image that is more similar to the capacity of the human eye. The human eye uses an iris to constantly adapt to a broad range of luminance in a viewed scene. The brain continuously interprets this viewed information so the viewer can see in a wide range of light conditions. In contrast, existing imaging technology generally captures smaller luminance ranges in a captured image.

HDR images can represent a greater range of luminance levels than can be achieved using devices which capture lower luminance ranges. Examples of scenes with a greater range of luminance that can be captured can include many real-world scenes containing very bright, direct sunlight to extreme shade, dark images with a larger luminance range or faint images of space. HDR images are often created by combining multiple, narrower range exposures of the same scene or subject. Most image sensors or cameras take photographs with a limited exposure range resulting in the loss of detail in highlights or shadows.

HDR images can be created from merging multiple low-dynamic-range (LDR) or standard-dynamic-range (SDR) photographs. HDR images can also be acquired using special image sensor configurations that are expensive, such as the use of multiple camera heads which can be used for capturing images with multiple exposure levels used in HDR images.

DETAILED DESCRIPTION

Figure 1A:
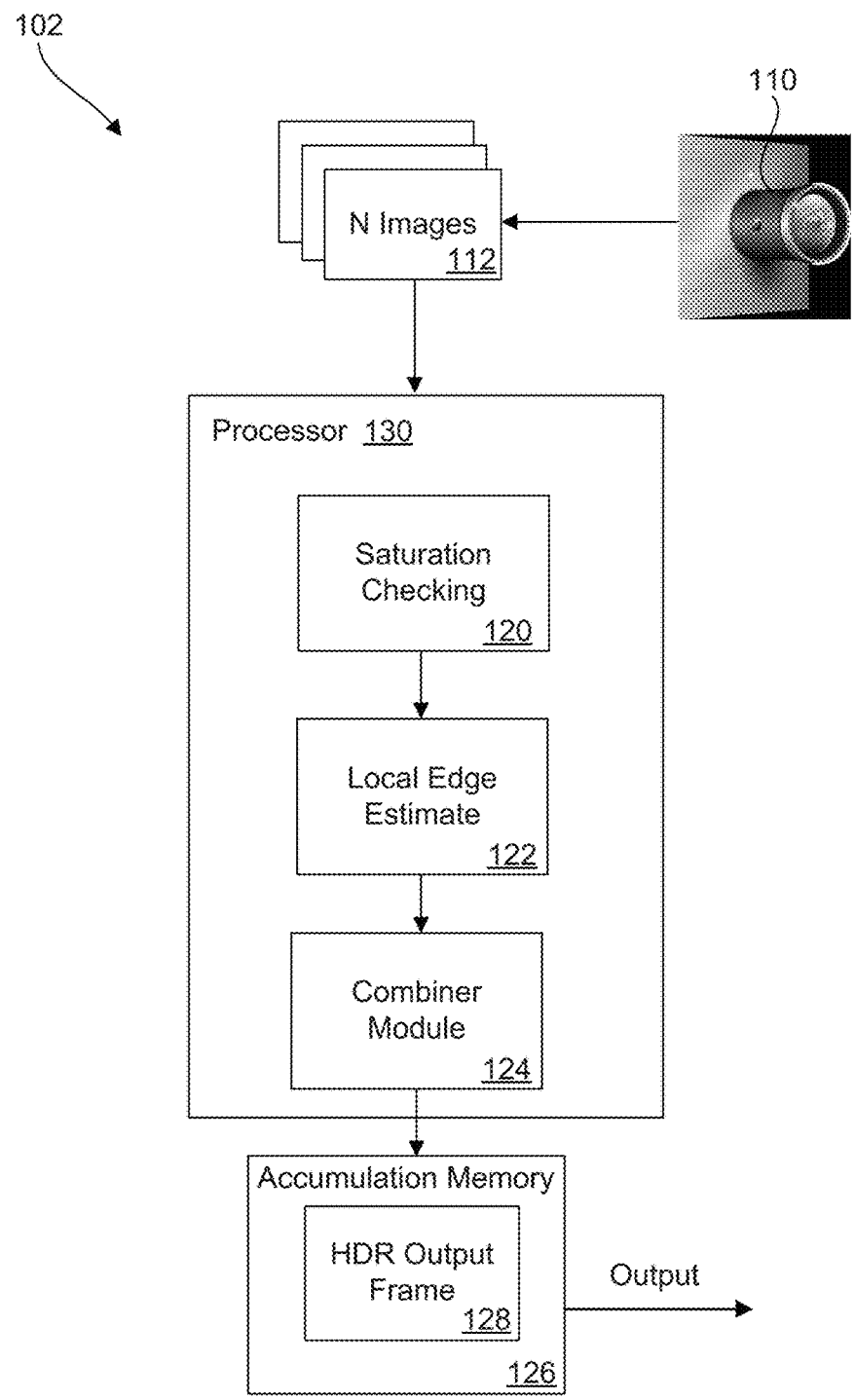
FIG. 1A is a block diagram illustrating an example of a system for creation of time multiplexed, high dynamic range images.

A technology can be provided for the creation of time multiplexed, high dynamic range (HDR) images. These images can be used in full motion video at a pre-determined frame rate (e.g., 20 to 60+ frames per second) or still images can be created. A method for performing the technology can include operations for creating the HDR images. For example, a first image with a base exposure level can be obtained from an image sensor, and the first image can be stored in an accumulation memory. The image sensor can be a camera configured to capture images for the full motion video. In one configuration, the images can be stored in a Bayer color space and the image sensor or camera can be natively configured to capture images in the Bayer color space format. Other color image spaces can also be used by the image sensor.

A second image with a modified exposure level as compared to the base exposure level (e.g., an increased exposure level) can be obtained using the image sensor. Another operation can be a determination as to whether a saturation level of incoming pixels in the second image exceeds a saturation threshold. The incoming images can have the estimated image intensity computed for pixels in order to determine whether the pixels of the incoming image are below a saturation threshold and are to be combined with the image in the accumulation memory.

Additionally, a first local edge estimate of a local pixel group in the first image and a second local edge estimate of a second local pixel group in the second image can be determined. This local edge estimate can be determined using a gradient calculation or another local edge estimator. The first local edge estimate can be compared to the second local edge estimate to determine whether there has been a change in the local pixel group as compared to the second local pixel group due to movement in the image between capturing the first image and the second image. Where the saturation of the incoming pixels does not exceed the saturation level or saturation threshold, and the movement is below a movement threshold, then the individual pixels of the second image meeting these criteria can be combined with the respective pixels of the first image. The testing of the local edge estimate and saturation threshold can be performed on a pixel-by-pixel basis until every pixel from the second image that is below the saturation threshold, and where movement has not been detected, is combined into the first image.

The process of accumulating images into the accumulation buffer can be repeated for any number of incoming images to create output frames at an output frame rate. For example, the image sensor or camera can be operated at N times the output frame rate or the desired frame rate. Exposure can be set to one of N different levels for each of the N frames to form a dataset composed of the N captured frames. Each output frame can have N associated frames in the dataset that are used to form the HDR image. These N frames are used to create the HDR image and may not be generally viewable by a user. The process can use the accumulation memory recursively by combining each of N frames in a data set with the data stored the accumulation memory in order to reduce the overall memory requirements for creating the HDR image. More specifically, the previous result stored in the accumulation memory is combined with each incoming image frame until an output frame is completed.

This technology operates on a computing and imaging system which can have limited hardware and computing resources, but the system is still able to provide a HDR image. In past HDR systems, multiple images have been captured in a raw camera data format. Then the steps to convert to image to a viewable image were performed, such as demosaicing the image, color correcting the image, intensity correcting the image and/or converting the image to a CIE color space. At this point in prior systems, the multiple images in intensity space were combined together to make a final HDR image. This process of transforming images from a captured format to viewable images can occupy a lot of memory for multiple images but provides a desired mathematical output. In contrast, the present technology does not convert the incoming images to intensity space but accumulates the images in a raw image format (e.g., Bayer image space) in a single accumulation memory.

As discussed earlier, the present technology can capture N frames at a higher rate than a desired output rate and create a HDR image from the increased number of frames captured. For example, many existing off-the-shelf cameras run at 30 Hz and a higher frame rate which can be used for the additional images in a data set can be 60 Hz (2 captured frames for every output frame or display frame), 90 Hz (3 captured frames for every output frame) or a higher capture frame rate can also be used. The initial frame can be set at a base exposure (what might be considered a viewable photographic exposure) and then the image exposures can be increased for the subsequent image captures to capture the highlights of the image. As new information comes in for the darker parts of the image, the useful parts of the incoming images can be intelligently combined with the currently stored image in the accumulation memory, so the brighter parts of the image can remain unchanged. This results in the time-multiplexed exposure output.

The term pixel as used in this description can include any type of picture element or image sub-element that represents an intensity and/or color value. While a pixel can map directly to a physical capture element of an image sensor or a physical output element on a display (e.g., a display pel), a one-to-one mapping between the physical capture or display elements and the mathematical pixels may not always be used.

FIG. 1A illustrates a system 102 and a method that is provided to generate high dynamic (HDR) range images using time multiplexing. This system and method will be explained in terms of an example of combining two images. However, when the system is operated in full motion video (FMV) mode, a sensor device or camera can be operated at N times the desired frame rate and N frames per output frame can be processed. More specifically, the system can include an image sensor 110 or camera configured to capture a first image 112 having a base exposure level. The image sensor 110 or camera can use a ROTC (readout integrated circuit), a CMOS (complementary metal-oxide-semiconductor) sensor or another image capture sensor. This system can also use existing off the shelf (OTS) camera hardware with the image processing method.

An accumulation memory 126 that is in communication with the image sensor 110 can be included in the system 102. The accumulation memory 126 can be configured to store the first image 112 in the accumulation memory. A processor 130 or group of processors, such as FPGA (field programmable gate array), custom ASIC (application specific integrated circuit) or another processor associated with memory, can be configured to receive or obtain a second image 112 from the image sensor 110. The second image can have an increased exposure level as compared to a base exposure level of the prior image (i.e., first image).

The processor 130 can use a saturation checking module 120 or saturation logic to check the saturation of each of the incoming pixels in the second image as compared to respective pixels at a corresponding row and column in the first image. If the saturation of each incoming pixel does not exceed a pre-defined saturation threshold, then processing for that individual pixel can proceed. On the other hand, if the saturation level of the incoming pixel exceeds the saturation threshold, then the processing for the individual pixel can terminate because the saturation threshold has been exceeded and the pixel is not expected to improve the HDR image that is being accumulated.

In order to check the saturation of the pixels, a local area including pixels near to or adjacent to pixel being processed can be examined. The near neighbors examined to determine the pixel intensity may be the pixels in a local area near to or adjacent to the pixel being processed. In one example, the maximum intensity value of some or all of the pixels within a region (e.g., a 3×3 regions) can be used to estimate saturation. Using the maximum intensity value of the pixels means that no single component of an undersampled color (red, blue or green) has saturated. This computation of intensity (e.g., using maximum intensities) can be used in determining whether pixels of an incoming frame are recursively added into the stored frame in the accumulation memory 126 to accumulate the HDR image. The intensity of pixels stored in a Bayer image format is desired to be identified or estimated because the Bayer image format and/or RGB format does not provide the pixel intensity information in a single value or storage location for a pixel. As a related example, RGB does not store intensity for one image element or pixel, but stores intensity for each of the three colors being represented.

In previous HDR methods, a CIE based intensity conversion has been used before generating the HDR image. While an intensity based color space or a CIE color space may have been used for creating prior HDR images, these conversions to find the intensity for the entire image are slow and consume significant amounts of time and computing resources (i.e., processing and memory).

In contrast, the technology described herein uses an in-process estimation of pixel intensity or image element intensity. An example high level calculation that can be used to estimate the intensity in the present technology is finding a local maximum intensity value of the red, green, and blue pixels for nearby pixels stored in Bayer image format. This calculation may include pixels in a 3×3 grid, 4×4 grid, 5×5 grid, an irregular shape, or a screen door type of pattern near to or adjacent to the incoming pixel(s). This example of intensity estimation can provide a general estimation of intensity to enable a decision to be made as to whether to combine a pixel from the incoming image at a selected location with the corresponding pixel of the stored image. This type of pixel intensity estimate uses a limited amount of processing and memory resources and is comparatively fast. For example, dividing by two once or twice may only take a couple of register shifts in the arithmetic logic unit (ALU) hardware. This intensity estimate can take place for pixels in both the first and the second images, so a determination can be made as to which pixels can be combined.

While this method has been described in terms of combining two, three or four images, any number of multiple images or N images can be combined together to form the HDR output frames. For example. N can be set from 2 to 60. Current image sensors or cameras can be able to capture 1,000 frames per second or even a higher number of frames per second. For each HDR output frame, there can be N other images (e.g., 5, 10, 20 or 30 images) captured and combined together to create the HDR output frame.

Where there are N images being captured, then the exposure can be set to N different levels (e.g., a different level for each image). These N camera frames can compose a dataset that is combined to create an HDR output frame. The first image or first frame of the N images can be an initial exposure frame that can target a 1% saturation of the image highlights. This image can be considered a typical exposure or base exposure. That first frame can be stored to memory without being processed. The next N-1 frames can operate to provide progressively increasing exposures (i.e., increasing exposure time), where the exposure ratios are optimized for the scene being imaged. Each of these N frames can be progressively more "over exposed". For example, in the day, the camera can generate output images at 30 Hz for the desired output frames. In addition, the image sensor can actually run at N times the desired frame rate or 150 Hz (N=5) to provide the additional frames to be used for the HDR images. At night, the camera can output HDR images at 7.5 Hz for the desired frame rate and then the camera can rum at 15 Hz (N=2) in order to capture the additional exposures for the HDR image.

As each frame in a dataset is received, the incoming frame can be conditionally combined with the existing frame already accumulated within the accumulation memory 126 or digital frame memory. The conditional accumulation can be based on an estimated local intensity for each individual pixel or image element. Because the final image has not been produced, the pixel intensity can be estimated from the raw image sensor output as described earlier. When an incoming pixel is over saturated then the incoming pixel is not used and the incoming pixel is not combined into the stored image in the accumulation memory.

In another configuration of the technology where additional conditions are checked for combining images, a local edge estimate module 122 or logic can compute and determine a first local edge estimate of a local pixel group for an individual pixel in the first image. A second local edge estimate of a second local pixel group for a corresponding pixel in the second image (i.e., corresponding x and y position in both images) can also be computed by the local edge estimate module 122. The local edge estimate can be calculated using an image gradient calculation or gradient estimate. As other examples, the Canny edge detector, search based methods, zero crossing methods, or other edge detection methods can also be used for the local edge estimate. The first local edge estimate can then be compared to the second local edge estimate to determine whether there is movement in the local pixel group for the individual pixel as compared to the second local pixel group between the capture of the first image and the second image. For example, if the output values from the first local edge estimate and the second local edge estimate are the same, then no movement has occurred. Conversely, if the output value from the first local edge estimate and the second local edge estimate are significantly different (e.g., the difference is outside a constraint), then movement may have occurred.

In the first case, a determination can be made that there is little or no movement between certain pixels in the first image and the second image. When the second local pixel group of the second image has not moved significantly with respect to a corresponding local pixel group in the first image, the pixels from the second image can be combined with the pixels of the first image to form a HDR image in the accumulation memory 126.

When an incoming frame (e.g., newly captured frame or input frame) is combined with a stored frame in the accumulation memory 126, such combination operations can be considered recursive because each incoming frame is combined with the stored image and then stored as an updated image. The updated image can be stored in the accumulation memory 126. Thus, the pixel values of the stored image stored in the accumulation memory 126 are combined with the pixel values of the incoming image to create an updated HDR output frame 128 to be stored in the accumulation memory 126. Adding each newly captured image with increased exposure (e.g., potentially increased intensity) to the accumulation memory can reduce the overall memory resources used during creation of the HDR output frame 128. As a result, memory configured for storing a single image frame is used to compose each HDR output frame 128.

A pseudo code example can be provided for calculating a local edge estimate for pixels in the accumulated stored frame and the incoming frame.

At the green locations:

$$\text{delta\_}H=\text{abs}(\text{inB}(i,j-2)+\text{inB}(i,j+2)-2*\text{inB}(i,j))+\text{abs}(\text{inG}(i,j-1)-\text{inG}(i,j+1));$$

$$\text{delta\_}V=\text{abs}(\text{inB}(i-2,j)+\text{inB}(i+2,j)-2*\text{inB}(i,j))+\text{abs}(\text{inG}(i-1,j)-\text{inG}(i+1,j));$$

At the red/blue locations:

$$\text{delta\_}H=\text{abs}(\text{inR}(i,j-2)+\text{inR}(i,j+2)-2*\text{inR}(i,j))+\text{abs}(\text{inG}(i,j-1)-\text{inG}(i,j+1));$$

$$\text{delta\_}V=\text{abs}(\text{inR}(i-2,j)+\text{inR}(i+2,j)-2*\text{inR}(i,j))+\text{abs}(\text{inG}(i-1,j)-\text{inG}(i+1,j));$$

It is noted that "inB," "inG" and "inR" refers to the input Blue, input Green and input Red, respectively, at specific relative positions in the array. The local edge estimate estimation can be made for each one of the pixel locations for the stored image or stored frame in the accumulation memory 126 and for the incoming frame. The local edge estimate calculation can estimate the local edge in the horizontal and/or vertical location by using a local edge estimate. This example of local edge estimation can be computed using the undersampled data (e.g., Bayer pattern data). Since the format of the example images described here is an undersampled format, then a different computation is used for the green pixels vs. the red/blue pixels. Any type of known local edge estimation can be used, but this example of local edge estimation is being used to test for movement in order to create an HDR output frame and the local edge estimation is not used for demosaicing.

The local edge estimations can be used to determine if the incoming pixel has movement in the local pixel area. If there is local movement at or near the pixel, then the incoming pixel will not be used because incorporating the incoming pixel can blur the image. For example, if there is a moving object (e.g., a moving person, vehicle, animal, etc.), avoiding blurring that object improves the overall quality of the image.

Ghosting can be less of a problem than blurriness, but avoiding incorporating pixels from an incoming image when there is local movement at or near the pixel can also avoid creating a ghost behind an object as the object is moving through a field of view. The time multiplexed image as described in this description can create artifacts, but checking for movement using the local edge estimations helps to minimize such possible visual artifacts.

In the example of combining two images, the pixels from the first image can be combined with the pixels from the second image by averaging pixels from the second image together with the first image. The combining of two pixels can take place using the combiner module 124. Alternatively, the pixels from the second image can be combined together with the first image using a non-linear combination of the pixel values. This non-linear operation can be where the amount of color and/or intensity from a pixel that is combined into the first image can be scaled based on the color and/or intensity of the incoming pixel. For example, as the color saturation and/or intensity of an incoming pixel in an incoming frame increases, the amount of the incoming pixel combined with the stored image can decrease inversely. In another configuration, a fixed percentage of the incoming pixel from the second image can be added to the first image. For example, 10% up to 90% of the color and intensity of each pixel from the second image might be added to the first image.

Combining a pixel in the accumulation memory with the incoming pixel value can also provide noise suppression for the final HDR image. For example, averaging the stored pixel with the incoming pixel can suppress noise in the image.

In one configuration, the combining of the pixels from the incoming image and the stored image in accumulation memory can occur based on how different the input pixel intensity is from the stored output intensity. In the case where a pixel in the stored image (in accumulation memory) is black, but the incoming pixel is grey, then the gray pixel can be used in favor of the black pixel and the black pixel may not be averaged together with the grey pixel. This is because the black pixel would otherwise overly dominate the incoming pixel. The pixels can also be combined together in varying combinations, especially as the pixels' color and/or intensity are located on either edge of the intensity spectrum (e.g., very white or very black), In another aspect, an intensity histogram of the incoming image can be created and analyzed. Based upon an analysis of the intensity histogram, the system can determine the exposure levels to be used for the subsequent images to be captured. For example, where the incoming image has a histogram that is dominated heavily by black, then the next image can have the exposure increased by three or four exposure steps rather than just one exposure step. This dynamic exposure determination can avoid the situation where the capture of only one exposure step higher might not provide practically usable image content for the final HDR image. In a more specific example, a bi-modal image can have an intensity histogram with a large number of dominant values in a dark part of the histogram and a large number of dominant values in a lighter part of the histogram. In such a case, a two times (2×) increase in exposure might not provide anything useful for the final HDR output frame. Thus, jumping up to an eight times (8×) exposure as compared to the base exposure level can provide better results. Such exposure control techniques can also be helpful in the case of a dark scene with a reflective object in the scene (e.g., Dark parking lot with reflective vehicle). In a similar example, the system can analyze the 50% point and 25% of the histogram or a cumulative distribution function (CDF) in order to pick the next exposure level for the incoming image. The overall exposure for the next incoming image can be set by controlling the length of time the camera exposes the frame (i.e., enables the image sensor to capture light).

An example of pseudo code for combining the incoming pixel values with stored pixels values and then storing the pixels in memory for the HDR output frame of the data set can be:

```
if saturation_estimate(pixel_new(i)) > saturation_limit)
    -- the input is saturated, don't include it
    Pixel(i) = Pixel_prev(i);
else if ((abs(delta_H_prev - delta_H_new) > threshold) or
        (abs(delta_V_prev - delta_V_new) > threshold)
    -- the edge has moved, don't blur
    Pixel(i) = Pixel_prev(i)
else
    -- average the signal
    Pixel(i) = (Pixel_prev(i) + Pixel_new(i)) / 2;
end if;
```

Once the entire data set has been processed (e.g., N images for an output frame), the output frame (e.g., a Bayer image) can be converted to a displayable image using existing color space conversion techniques. After an entire dataset of N images has been accumulated and the output frame has been output, the accumulation memory can be cleared to prepare for the next dataset.

The operations described for checking saturation, local edge estimate, and combining the pixels can be performed on a pixel-by-pixel basis. Accordingly, the pixels can be operated on in a row-by-row or column-by-column order in the image until any pixels that are eligible for combining for the two images have been combined. There can be some pixels from the second image or incoming image that are not eligible to be combined into the first image due to oversaturation, movement or other factors. Such pixels can be skipped when identified. The HDR output frame 128 which has been created can then be sent from the accumulation memory 126 across a computer network or a computing bus for storage, pattern recognition, machine vision, viewing by an end user, etc. The image can also be sent to a remote mobile device or a command station where the image can be viewed.

Figure 1B:
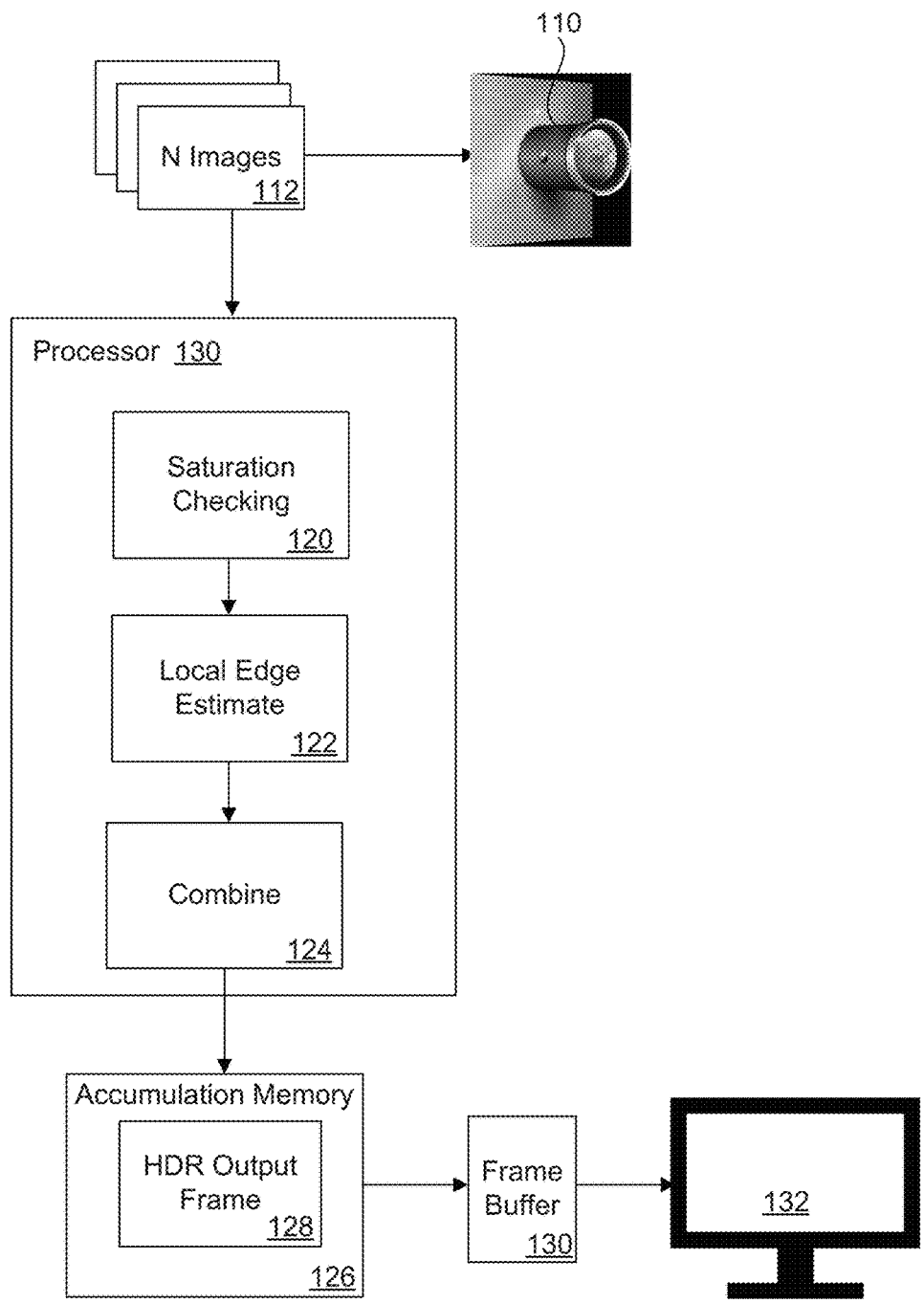
FIG. 1B is a block diagram illustrating an example of a system for creation of time multiplexed, high dynamic range images that are output to a frame buffer.

FIG. 1B illustrates a system for creating time multiplexed HDR images with a connected output display. The camera 110, processor 130, accumulation memory 126 and other elements in FIG. 1B can operate in a similar way as the elements of FIG. 1A. In addition to creating the HDR output frame 128, a frame buffer 130 can be configured to receive the HDR output frame 128 from the accumulation memory 126. The frame buffer 130 can provide the image information (e.g., a completed HDR image bitmap) to refresh a display device 132 in communication with the frame buffer 130 to output the HDR image for viewing by an end user or other viewer. The display device can be a LCD (liquid crystal display), plasma display, OLED (organic light emitting diode) display, or any other display type.

This technology can be used to create High Dynamic Range (HDR) video which is useful for imaging scenes with very dark and light areas. Rather than having to deploy expensive hardware with multiple camera heads, the capability to create HDR video using a single camera with software and firmware changes is desirable. This technology can be activated or deactivated as desired by the operator, without losing any existing imaging capability. This means the end user or operator can turn on or off the HDR video capability at any time using a software interface.

In the past, when Full Motion Video (FMV) HDR systems have been constructed, such systems have utilized expensive custom ROICs or multiple camera heads which can increase the overall camera cost relative to the number of camera heads used or the specialized hardware which can be used. Some FMV configurations have custom ROICs or custom cameras which can cost millions of dollars to develop. While use of multiple cameras can provide HDR images, these configurations use significant amounts of memory, additional hardware, and processing power.

In addition, the use of multiple cameras can include complicated mechanical alignments that move in a tactical environment. When complicated mechanical mechanisms are used, these mechanisms can create additional failure points for the imaging device, especially when the imaging devices are used in high demand military or commercial applications. The specialized hardware used in a multiple camera head configuration can be an expensive hardware investment for applications that can use HDR images periodically (e.g., at dusk or sunrise, in low lighting conditions, etc.).

Still cameras have been available that implement multiple exposures to form an HDR image, but still cameras produce a single still and take significant time to form the image. Still HDR imaging is not suitable for a military environment or other demanding environments. While hardware multiplexed exposure systems have been produced using multiple cameras and specialized hardware, these systems use expensive processing resources and have relatively high latency and low frame rates. The HDR technology described in this disclosure overcomes these limitations by providing HDR video or images without using overly complicated or expensive hardware, thus making military and other uses possible.

Figure 1C:
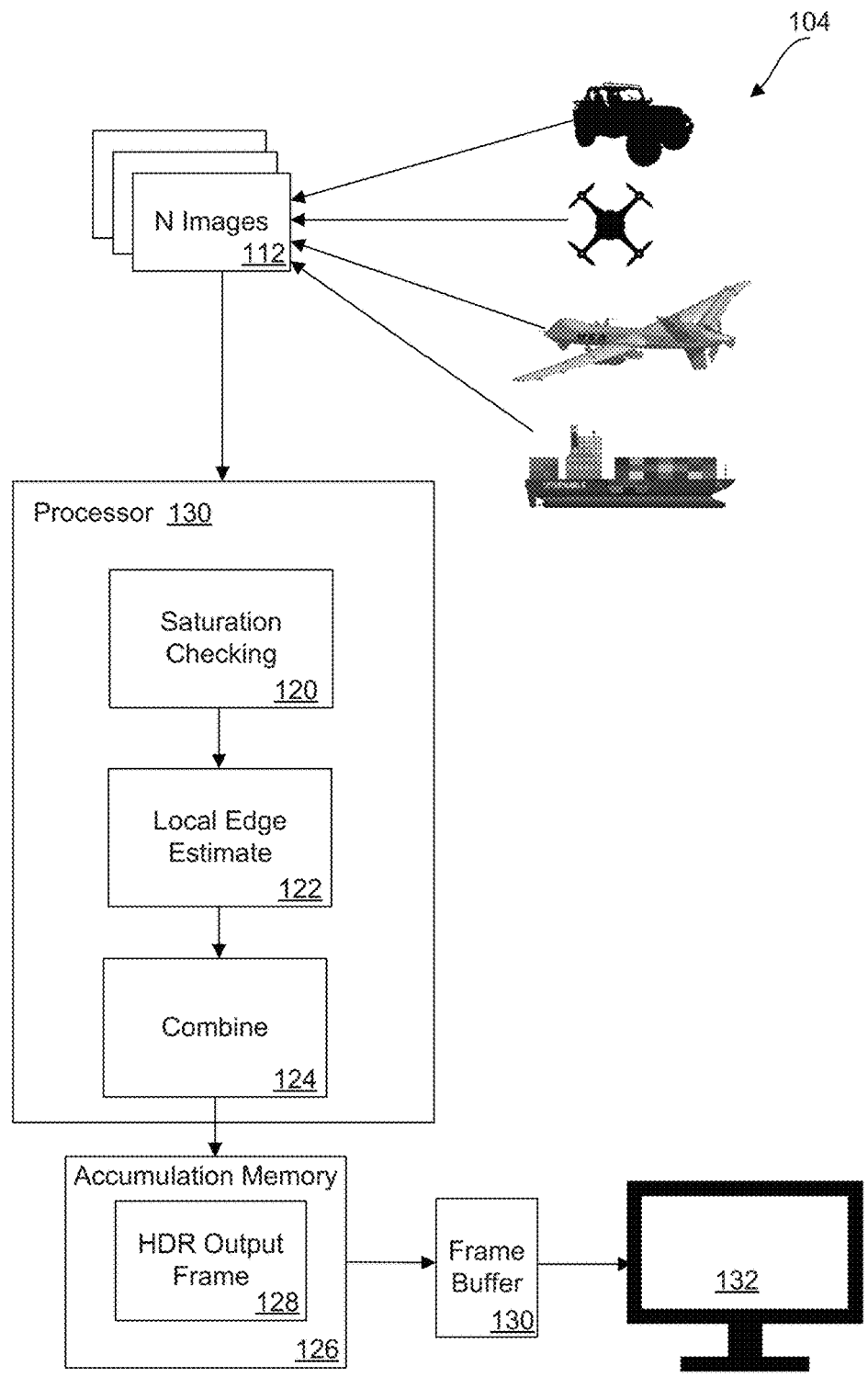
FIG. 1C is a block diagram illustrating an example of a system for creation of time multiplexed, high dynamic range images using images captured from manned or unmanned vehicles.

The present technology can provide HDR video or still images for resource constrained systems that include one camera. More specifically, this technology can be used to capture video from cameras on manned or unmanned vehicles, as illustrated in FIG. 1C. For example, HDR images can be created from cameras mounted on flying drones, road vehicle drones, ships or other types of vehicles 104. In other examples, HDR video can be generated from images captured by security cameras, assembly line cameras, packaging facility cameras, farm equipment cameras, or other internet of things (IoT) devices with cameras.

Figure 2:
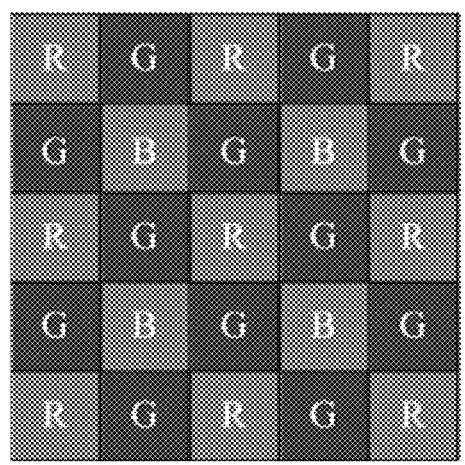
FIG. 2 is an illustration of a portion of an image stored in a Bayer color space that can be captured by an image sensor for creation of time multiplexed, high dynamic range images.

FIG. 2 illustrates that the images captured from the camera can be in a Bayer image pattern 200. In Bayer image pattern configured cameras, color filters are placed over intensity sensing hardware or semiconductors in a grid, as shown in FIG. 2. The raw, undersampled colors for the image can eventually be processed to create an RGB image using known image techniques.

Because this technology can operate in the Bayer domain, implementing this technology takes significantly less computing resources than computing images in an intensity space (CIE, YUV). This result is provided because converting to intensity space can increase memory and processing throughput requirements. Due to the resource and cost constraints of providing HDR video with a single camera, this camera can use an undersampled Bayer color space. The images in this technology can stay in the native color space or raw format, as captured by the camera, to conserve memory and decrease other resources used for processing. The image may not be converted to a fully de-mosaiced CIE color space image during accumulation of the image because maintaining the image in Bayer space can conserve memory and processing resources. However, the full conversion can take place when the time multiplexed HDR output frame has been created. More specifically, the image stored in the accumulation memory will also be stored in the Bayer image format or another native camera format. Once the HDR image has been accumulated, then normal image processing can take place to convert the image from Bayer image format to an RGB or another intensity based image format for viewing.

Existing image processing methods can be used to generate the final viewable image. Prior imaging methods that process multiple images from multiple camera heads to create a HDR image might end up with 4 image streams and 3 images per stream, and this results in 12 finished images to be combined which consumes large amounts of memory and processing. In contrast, this technology has just one output frame and that one image can be converted to a viewable image using known de-mosaicing, color correction, intensity correction and/or converting the image to a CIE color space. Alternatively, the images can be stored in color spaces such as: an intensity space, RGB (Red, Green, Blue), CMYK (Cyan, Magenta, Yellow, Key) or other image color spaces. There are other color filter array patterns that are not Bayer pattern arrays which can be used with this technology for storing images captured from a camera. For example, a manufacturer can use proprietary color filter patterns and arrays (e.g., Sony format or another raw image format) for storing the captured images. The operations used in this technology can be modified to process such varying image formats to recursively create the multiplexed HDR images.

Figure 3:
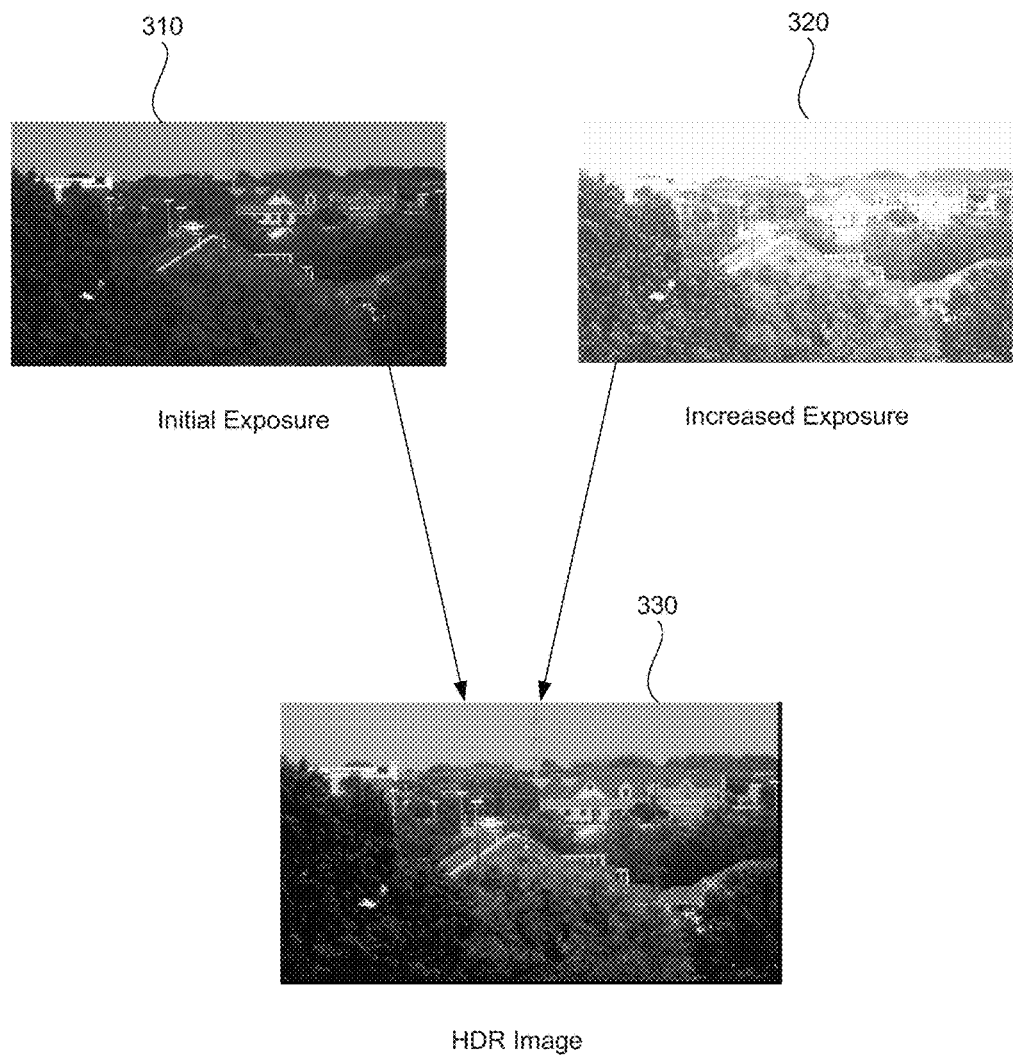
FIG. 3 is a flowchart illustrating an example of an initial exposure and an image with increased exposure that can be combined to create a HDR image.

FIG. 3 illustrates an initial exposure image 310 with a base exposure level that has been captured by a camera. An intentionally increased exposure image 320 can also be captured by the camera at a subsequent point in time (e.g., immediately after the initial exposure image). Both of these images can be combined together using the operations described previously to obtain an HDR image 330 that has a higher dynamic range than either the initial exposure image 310 or the increased exposure image 330 separately.

While the example description of this technology in FIG. 3 has been primarily explained using two images or camera exposures, any number of images can be used to obtain the final HDR output frame 128. For example, the system can obtain N images for each output frame in an output frame rate that is desired. Thus, an output frame rate for output frames from the image sensor can be set and the image sensor can be operated at N times the output frame rate to capture N times as many images as the output frame rate. The pixels of the N images can be combined together to form the HDR image. If the desired image output rate is 24 frames per second, then the camera can be run at 72 frames per second. This provides 3 images that can be combined together to create each HDR output frame 128 or output frame. Any number of images can be used create the HDR output frame 128. The N number of images used to create the HDR output frame can be any number of images from 2 images up to thousands of images 2,000 images per output frame) with the only limit being the capabilities of the camera hardware, accumulation memory and processing power available to combine the images. The N images can be captured or obtained at increasingly greater exposure levels. For example, the first exposure level can be 0, the second exposure level +2, the third exposure level +4 and so on.

Figure 4:
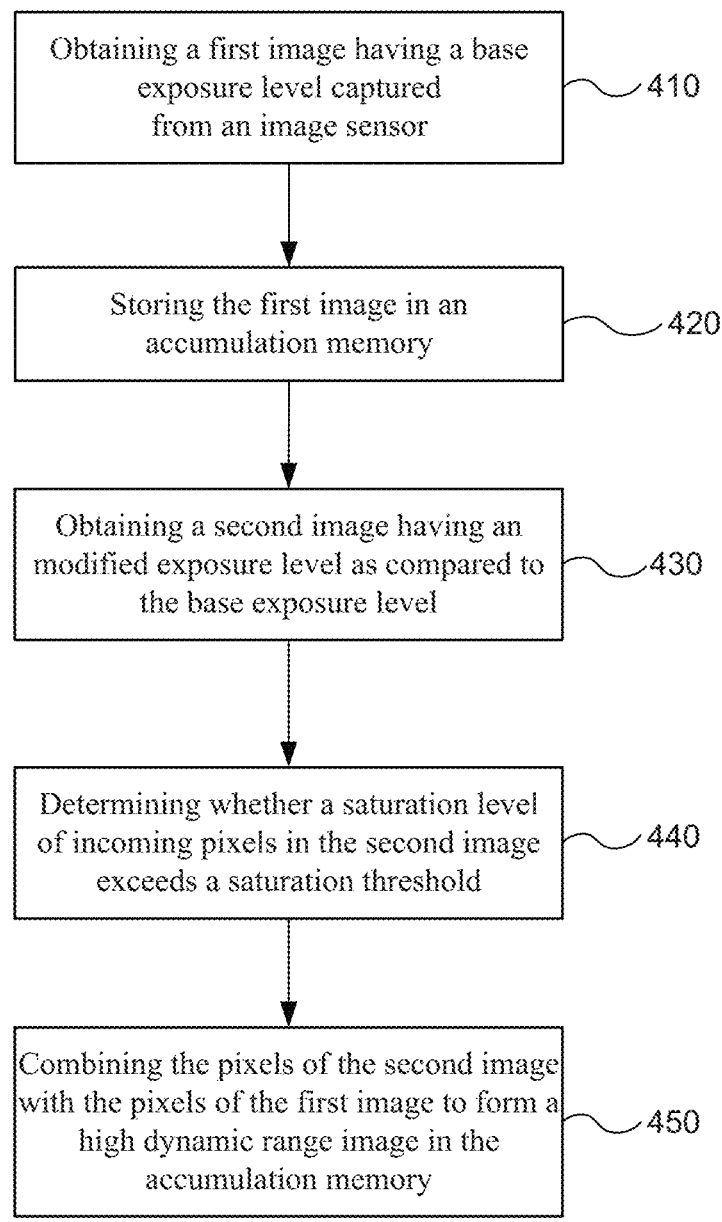
FIG. 4 is a flow chart diagram illustrating an example of operations for creation of time multiplexed, high dynamic range images.

FIG. 4 illustrates a method for generating time multiplexed, high dynamic range images. The method can include a first operation of obtaining a first image having a base exposure level captured from an image sensor, as in block 410. The first image can be stored in an accumulation memory, as in block 420. A second image can be obtained that has a modified exposure level (e.g., an increased exposure level) compared to the base exposure level, as in block 430.

A determination can be performed for whether a saturation level of incoming pixels in the second image exceeds a saturation threshold as in block 440. To test the saturation level of the incoming pixels, an estimated intensity for a pixel can be computed. When using the Bayer image pattern for storing the captured images, the intensity of each pixel can be estimated to enable combining the N images. This technology can estimate intensity without the need for a full conversion to a new color space (CIE, YUV). In one example, the saturation can be estimated by finding a local maximum for intensity in a pixel region. This pixel region may include some or all of the pixels near to or adjacent to the incoming pixel being processed. The region may be 3×3 in size or another useful size (e.g. N×N) in the vicinity of the incoming pixel.

The pixels of the second image that do not have an intensity that exceeds a defined threshold can be combined with the pixels of the first image to form a high dynamic range image in the accumulation memory, as in block 450. In the case of night time image capture with a streetlight, the base image can be a very dark first image. In the next exposure, the streetlight can be over exposed and the pixels associated with the street light can be discarded and not be combined into the accumulated image. However, other dimmer lights and reflections will be easier for an end user to see and since the dimmer lights and reflections do not exceed the saturation level threshold, these dimmer lights and reflections can be combined into the accumulated image. These additional details can allow the final image viewer to see what is in the shadows. For each additional frame, each lighter area gets added to the frame, as long as the saturation level threshold is not exceeded.

In a further configuration of the technology, a first local edge estimate of a local pixel group in the first image can be determined, and a second local edge estimate of the local pixel group in the second image can also be determined. The first local edge estimate can be compared to the second local edge estimate to determine whether there has been movement in the local pixel group of the first image as compared to a second local pixel group between capturing the first image and the second image. If the movement is below a movement threshold for each pixel, the appropriate pixels of the second image can be combined with the pixels of the first image.

The first image can be combined with the second image by averaging pixels from the second image together with the first image. Alternatively, combining the first image together with the second image can be combining pixels from the second image together with the first image using a non-linear combination.

For a defined output frame rate, N images at increasingly greater exposure levels can be obtained for each output frame of an output frame rate. Based on a defined output frame rate for output frames from the image sensor, the image sensor can be operated at N times the output frame rate to capture N times as many images as the output frame rate. The respective pixels of the N images can be combined together to form a high dynamic range image. Finally, the high dynamic range image can be sent to a frame buffer memory and display device for display.

In another example method, operations for the technology can be stored on a non-transitory machine readable storage medium having instructions which when executed can cause a processor to generate high dynamic range images that are time multiplexed. The technology can obtain a first image having a base exposure level captured from a camera, and storing the first image in an accumulation memory. A second image can be obtained with an increased exposure level as compared to a base exposure level. The incoming saturation level of incoming pixels in the second image can be checked to see if the pixels' intensities exceed a saturation threshold.

A first local edge estimate of a local pixel group in the first image and a second local edge estimate of the local pixel group in the second image can be computed. The first local edge estimate can be compared to the second local edge estimate to determine whether there has been movement above a movement threshold in the local pixel group between capturing the first image and the second image. When the movement is below the movement threshold and the saturation threshold has not been exceeded, the pixels of the second image can be combined with the pixels of the first image in the accumulation memory.

This technology has been described as using an initial exposure and increasing the exposure time for subsequent images that can be combined together for the HDR image. However, the reverse process can also be used. The initial image can start out with an image that has a high exposure level. Then subsequent images with decreasing exposure can be captured and combined together with the initial image to create the HDR image for an output frame.

Figure 5:
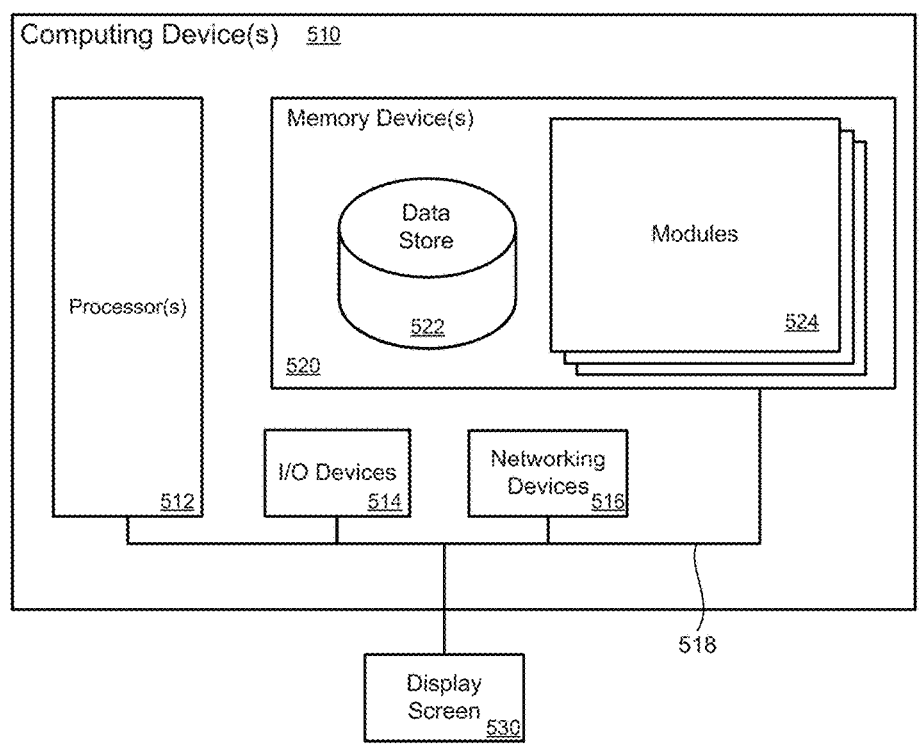
FIG. 5 is a block diagram that provides an example illustration of a computing device that can be employed in the present technology.

FIG. 5 illustrates a computing device 510 on which modules of this technology can execute. A computing device 510 is illustrated on which a high level example of the technology can be executed. The computing device 510 can include one or more processors 512 that are in communication with memory devices 520. The computing device can include a local communication interface 518 for the components in the computing device. For example, the local communication interface can be a local data bus and/or any related address or control busses as can be desired.

The memory device 520 can contain modules 524 that are executable by the processor(s) 512 and data for the modules 524. The modules 524 can execute the functions described earlier. A data store 522 can also be available for storing code or data used by the modules.

Other applications can also be stored in the memory device 520 and can be executable by the processor(s) 512. Components or modules discussed in this description can be implemented in the form of software using high programming level languages that are compiled, interpreted or executed using a hybrid of the methods.

The computing device can also have access to I/O (input/output) devices 514 that are usable by the computing devices. An example of an I/O device is a display screen 530 that is available to display output from the computing devices. Other known I/O device can be used with the computing device as desired. Networking devices 516 and similar communication devices can be included in the computing device. The networking devices 516 can be wired or wireless networking devices that connect to the Internet, a LAN, WAN, or other computing network.

The components or modules that are shown as being stored in the memory device 520 can be executed by the processor 512. The term "executable" can mean a program file that is in a form that can be executed by a processor 512. For example, a program in a higher level language can be compiled into machine code in a format that can be loaded into a random access portion of the memory device 520 and executed by the processor 512, or source code can be loaded by another executable program and interpreted to generate instructions in a random access portion of the memory to be executed by a processor. The executable program can be stored in any portion or component of the memory device 520. For example, the memory device 520 can be random access memory (RAM), read only memory (ROM), flash memory, a solid-state drive, memory card, a hard drive, optical disk, floppy disk, magnetic tape, or any other memory components.

The processor 512 can represent multiple processors and the memory 520 can represent multiple memory units that operate in parallel to the processing circuits. This can provide parallel processing channels for the processes and data in the system. The local interface 518 can be used as a network to facilitate communication between any of the multiple processors and multiple memories. The local interface 518 can use additional systems designed for coordinating communication such as load balancing, hulk data transfer, and similar systems.

While the flowcharts presented for this technology can imply a specific order of execution, the order of execution can differ from what is illustrated. For example, the order of two more blocks can be rearranged relative to the order shown. Further, two or more blocks shown in succession can be executed in parallel or with partial parallelization. In some configurations, one or more blocks shown in the flow chart can be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more blocks of computer instructions, which can be organized as an object, procedure, or function. Nevertheless, the executables of an identified module need not be physically located together, but can comprise disparate instructions stored in different locations which comprise the module and achieve the stated purpose for the module when joined logically together.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices. The modules can be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein can also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics can be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

The invention claimed is:

1. A method for generating a time multiplexed, high dynamic range image, comprising:
   obtaining a first image having a base exposure level captured from an image sensor;
   storing the first image in an accumulation memory;
   obtaining a second image having a modified exposure level as compared to the base exposure level;
   determining whether a saturation level of incoming pixels in the second image exceed a saturation threshold; and
   combining the incoming pixels of the second image which have saturation below the saturation threshold with stored pixels of the first image to form the high dynamic range image to be stored in the accumulation memory.

2. The method as in claim 1, further comprising estimating saturation of a pixel by finding a local maximum intensity value of pixels near an incoming pixel.

3. The method as in claim 1, further comprising estimating saturation of a pixel by using the incoming pixel in addition to the pixels near the incoming pixel.

4. The method as in claim 1, further comprising:
determining a first local edge estimate of a local pixel group in the first image;
determining a second local edge estimate of a second local pixel group in the second image;
comparing the first local edge estimate to the second local edge estimate to determine whether there has been movement between the local pixel group and the second local pixel group; and
combining the pixels of the second image with the pixels of the first image when movement is below a movement threshold.

5. The method as in claim 1, wherein the step of combining incoming pixels for the first image with stored pixels for the second image further comprises averaging incoming pixels from the second image together with the stored pixels of the first image.

6. The method as in claim 1, further comprising:
obtaining N images for each output frame associated with an output frame rate; and
combining the pixels of the N images together selectively to form the high dynamic range image.

7. The method as in claim 6, further comprising obtaining the N images at increasingly greater exposure levels.

8. The method as in claim 1, further comprising obtaining the first image from the image sensor which is a ROIC (readout integrated circuit) or a CMOS (complementary metal-oxide-semiconductor) sensor.

9. The method as in claim 1, further comprising storing the first image and second image in a Bayer image format, an intensity format or a raw image sensor format.

10. The method as in claim 1, wherein the step of combining the first image with the second image further comprises combining incoming pixels of the second image together with stored pixels of the first image using a non-linear combination.

11. The method as in claim 1, wherein an output frame rate is set for output frames from the image sensor and the image sensor is operated at N times the output frame rate to capture N times as many images as the output frame rate.

12. The method as in claim 1, further comprising sending the high dynamic range image to a frame buffer memory and display device for display.

13. A non-transitory machine readable storage medium having instructions embodied thereon, the instructions when executed cause a processor to generate high dynamic range images that are time multiplexed, comprising:
obtaining a first image having a base exposure level captured from a camera;
storing the first image in an accumulation memory;
obtaining a second image having an increased exposure level as compared to the base exposure level;
checking whether a saturation level of incoming pixels in the second image exceeds a saturation threshold;
determining a first local edge estimate of a local pixel group in a defined location in the first image;
determining a second local edge estimate of a second local pixel group in the defined location of the second image;
comparing the first local edge estimate to the second local edge estimate to identify movement above a movement threshold in the local pixel group and the second local pixel group between capturing the first image and the second image; and
combining the incoming pixels of the second image with stored pixels of the first image in the accumulation memory where movement is below the movement threshold and the saturation threshold has not been exceeded.

14. The non-transitory machine readable storage medium as in claim 13, wherein the step of combining the incoming pixels of the first image with the stored pixels of the second image further comprises averaging pixels from the second image together with the first image.

15. The non-transitory machine readable storage medium as in claim 13, wherein the step of combining the incoming pixels of the first image with the stored pixels of the second image further comprises combining incoming pixels from the second image together with stored pixels of the first image using a non-linear calculation.

16. The non-transitory machine readable storage medium as in claim 13, wherein there is an output frame rate for output frames from the camera and the camera is operated at N times the output frame rate to capture N times as many images as the output frame rate to form a dataset of output images combined to form a high dynamic range image.

17. The non-transitory machine readable storage medium as in claim 13, further comprising obtaining N images for output frames being captured at an output frame rate.

18. The non-transitory machine readable storage medium as in claim 17, further comprising estimating saturation of a pixel in the first image or second image by determining a local maximum of intensity for pixels near to and including an incoming pixel being processed.

19. A system to generate high dynamic range images which are time multiplexed, comprising:
a camera to capture a first image having a base exposure level;
an accumulation memory, in communication with the camera, to store the first image in the accumulation memory;
a processor configured to:
obtain a second image from the camera, wherein the second image has an increased exposure level as compared to the base exposure level;
check a saturation of incoming pixels in the second image as compared to a saturation threshold;
determine a first local edge estimate of a local pixel group in the first image;
determine a second local edge estimate of a second local pixel group in the second image;
compare the first local edge estimate to the second local edge estimate to determine whether movement occurred between the local pixel group of the first image and the second local pixel group of the second image; and
combine the incoming pixels of the second image with the respective pixels of the first image where movement has not occurred between the local pixel group and the second local pixel group and the incoming pixels are not saturated, to form a high dynamic range image.

20. The system as in claim 19, further comprising:
a frame buffer configured to receive the high dynamic range image from the accumulation memory; and
a display device in communication with the frame buffer to output the high dynamic range image for viewing.

* * * * *